United States Patent
Miyakoshi et al.

(10) Patent No.: US 9,784,486 B2
(45) Date of Patent: Oct. 10, 2017

(54) MECHANISM FOR CONTROLLING REFRIGERANT IN A VEHICLE AIR CONDITIONING APPARATUS

(71) Applicant: SANDEN CORPORATION, Isesaki-shi, Gunma (JP)

(72) Inventors: Ryo Miyakoshi, Isesaki (JP); Kenichi Suzuki, Isesaki (JP)

(73) Assignee: SANDEN HOLDINGS CORPORATION, Isesaki-Shi, Gunma (JP)

( * ) Notice: Subject to any disclaimer, the term of this patent is extended or adjusted under 35 U.S.C. 154(b) by 539 days.

(21) Appl. No.: 14/363,911

(22) PCT Filed: Nov. 26, 2012

(86) PCT No.: PCT/JP2012/080471
§ 371 (c)(1),
(2) Date: Jun. 9, 2014

(87) PCT Pub. No.: WO2013/084738
PCT Pub. Date: Jun. 13, 2013

(65) Prior Publication Data
US 2014/0338382 A1    Nov. 20, 2014

(30) Foreign Application Priority Data
Dec. 9, 2011  (JP) .................. 2011-270686

(51) Int. Cl.
*F25D 21/06*   (2006.01)
*F25B 41/00*   (2006.01)
(Continued)

(52) U.S. Cl.
CPC ......... *F25B 30/02* (2013.01); *B60H 1/00921* (2013.01); *B60H 1/02* (2013.01);
(Continued)

(58) Field of Classification Search
CPC ...... F25B 2600/2521; F25B 2600/2513; F25B 2600/2511; F25B 47/006; B60H 1/00885; B60H 1/008999
(Continued)

(56) References Cited

U.S. PATENT DOCUMENTS 5,263,333 A * 11/1993 Kubo ............... F24F 3/065
                                                62/160
5,526,650 A *  6/1996 Iritani ............ B60H 1/00907
                                                62/205

(Continued)

FOREIGN PATENT DOCUMENTS

JP   H04-251164   9/1992
JP   H07-139827   6/1995
(Continued)

OTHER PUBLICATIONS

International Search Report dated Feb. 26, 2013, from corresponding International Application No. PCT/JP2012/080471.

*Primary Examiner* — Len Tran
*Assistant Examiner* — Paul Alvare
(74) *Attorney, Agent, or Firm* — Troutman Sanders LLP

(57) ABSTRACT

A vehicle air conditioning apparatus includes an outdoor expansion valve controller configured to control an evaporating temperature of a refrigerant in a heat exchanger by regulating an opening of an outdoor expansion valve during a heating and dehumidifying operation, an evaporating temperature control valve provided in a refrigerant flow passage to an output side of the heat exchanger from which the refrigerant is discharged, and configured to control the evaporating temperature of the refrigerant in the heat exchanger by regulating an amount of the refrigerant flowing through the refrigerant flow passage, a temperature detector configured to detect a temperature of the refrigerant in the heat exchanger, and a control changer configured to (Continued)

change control of the evaporating temperature of the refrigerant in the heat exchanger from by regulating an opening of the outdoor expansion valve to by regulating an opening of the evaporating temperature control valve.

14 Claims, 14 Drawing Sheets

(51) Int. Cl.
| | |
|---|---|
| F25B 27/00 | (2006.01) |
| F25B 30/02 | (2006.01) |
| F25B 5/00 | (2006.01) |
| F25B 6/02 | (2006.01) |
| F25B 40/00 | (2006.01) |
| F25B 41/04 | (2006.01) |
| B60H 1/00 | (2006.01) |
| B60H 1/02 | (2006.01) |

(52) U.S. Cl.
CPC .............. *F25B 5/00* (2013.01); *F25B 6/02* (2013.01); *F25B 40/00* (2013.01); *F25B 41/003* (2013.01); *F25B 41/04* (2013.01); *F25B 41/043* (2013.01); *F25B 2400/04* (2013.01); *F25B 2600/2521* (2013.01); *F25B 2700/1931* (2013.01)

(58) Field of Classification Search
USPC .......................................................... 62/156
See application file for complete search history.

(56) References Cited

U.S. PATENT DOCUMENTS

| | | | | |
|---|---|---|---|---|
| 5,560,217 | A * | 10/1996 | Takahashi | B60H 1/00392 62/200 |
| 5,615,560 | A * | 4/1997 | Inoue | B60H 1/00485 236/92 B |
| 5,704,219 | A * | 1/1998 | Suzuki | B60H 1/00907 237/2 B |
| 5,934,094 | A * | 8/1999 | Itoh | B60H 1/3205 62/160 |
| 6,422,308 | B1 * | 7/2002 | Okawara | B60H 1/00878 165/202 |
| 7,121,103 | B2 * | 10/2006 | Itoh | B60H 1/00735 62/173 |
| 2006/0191280 | A1 * | 8/2006 | Kurosawa | B60H 1/00921 62/324.1 |
| 2011/0005255 | A1 * | 1/2011 | Tanihata | B60H 1/00785 62/238.7 |
| 2012/0255319 | A1 * | 10/2012 | Itoh | F24F 3/1405 62/160 |
| 2012/0260679 | A1 * | 10/2012 | Huerta-Ochoa | F25B 41/062 62/56 |

FOREIGN PATENT DOCUMENTS

| | | |
|---|---|---|
| JP | H07-266860 | 10/1995 |
| JP | H08-040058 | 2/1996 |
| JP | 2004-189213 | 7/2004 |
| JP | 2009-264633 | 11/2009 |
| JP | 2009-264661 | 11/2009 |

* cited by examiner

MECHANISM FOR CONTROLLING REFRIGERANT IN A VEHICLE AIR CONDITIONING APPARATUS

CROSS-REFERENCE TO RELATED APPLICATIONS

This is a U.S. national phase application under 35 U.S.C. §371 of International Patent Application No. PCT/JP2012/080471, filed on Nov. 26, 2012, and claims benefit of priority to Japanese Patent Application No. 2011-270686, filed Dec. 9, 2011. The International Application was published on Jun. 13, 2013, as International Publication No. WO 2013/084738under PCT Article 21(2). The entire contents of these applications are hereby incorporated by reference.

TECHNICAL FIELD

The present invention relates to a vehicle air conditioning apparatus applicable to, for example, electric cars.

BACKGROUND ART

Conventionally, this sort of vehicle air conditioning apparatus includes: a compressor driven by an engine as a power source of a vehicle; a radiator provided outside the vehicle interior; and a heat exchanger provided in the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air subjected to a heat exchange with the refrigerant in the heat exchanger to the vehicle interior. In addition, such a conventional vehicle air conditioning apparatus includes a heater core and perform a heating operation by: releasing the exhaust heat from the cooling water used to cool the engine in the heater core; and blowing the air subjected to a heat exchange with the cooling water in the heater core to the vehicle interior. Moreover, such a conventional vehicle air conditioning apparatus performs a heating and dehumidifying operation by: cooling the air to be supplied to the vehicle interior to a required absolute humidity in the heat exchanger for dehumidification; heating the cooled and dehumidified air in the heat exchanger to a desired temperature in the heater core; and blowing the heated air to the vehicle interior.

The above-mentioned vehicle air conditioning apparatus uses the exhaust heat from the engine as a heat source to heat the air for a heating operation, or a heating and dehumidifying operation. Generally, an electric car uses an electric motor as a power source, and it is difficult to acquire the exhaust heat that can heat the air by using the electric motor without an engine. Therefore, the above-mentioned vehicle air conditioning apparatus is not applicable to electric cars.

Therefore, there has been known a vehicle air conditioning apparatus applicable to an electric car that includes: a compressor configured to compress and discharge a refrigerant; a radiator provided in the vehicle interior and configured to release the heat from the refrigerant; a heat exchanger provided in the vehicle interior and configured to absorb the heat into the refrigerant and an outdoor heat exchanger provided outside the vehicle interior and configured to release the heat from the refrigerant or absorb the heat into the refrigerant (see, for example, Patent Literature 1). In this vehicle air conditioning apparatus, the refrigerant discharged from the compressor releases the heat in the heat exchanger, is decompressed by the expansion valve and absorbs the heat, so that the heating operation is performed.

Meanwhile, in the vehicle air conditioning apparatus, the refrigerant discharged from the compressor releases the heat in the radiator, part of the refrigerant is decompressed by the expansion valve and absorbs the heat in the heat exchanger, and the remaining refrigerant is decompressed by the expansion valve and absorbs the heat in the outdoor heat exchanger, so that the heating and dehumidifying operation is performed.

CITATION LIST

Patent Literature

PTL1: Japanese Patent Application Laid-Open No. 2009-264661

SUMMARY OF INVENTION

Technical Problem

With the vehicle air conditioning apparatus applicable to an electric car, to perform the heating and dehumidifying operation, the expansion valves (temperature expansion valves) are provided upstream from the heating exchanger and the outdoor heat exchanger in the refrigerant flow passage, respectively to keep the respective evaporating temperature of the refrigerants in the heat exchanger and the outdoor exchanger constant. In this case, it is not possible to control the heat absorbing performance in the heat exchanger and the outdoor heat exchanger individually. Therefore, if the outdoor temperature is low, the evaporating temperature of the refrigerant in the outdoor heat exchanger is reduced, and consequently a frost is likely to be formed on the heat exchanger. If a frost is formed on the heat exchanger, the quantity of heat absorbed into the refrigerant in the heat exchanger is reduced, so that the heat radiation performance of the radiator deteriorates. This makes it difficult to control the temperature and the humidity of the vehicle interior to a preset temperature and a setting humidity.

It is therefore, an object of the present invention to provide a vehicle air conditioning apparatus that can secure the required quantity of heat absorbed into the refrigerant in the heat exchanger during the heating and dehumidifying operation, regardless of environmental conditions, for example, even if the outdoor temperature is low.

Solution to Problem

To achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; an outdoor heat exchanger provided outside the vehicle interior and configured to release the heat from the refrigerant or absorb the heat into the refrigerant; an indoor expansion valve configured to decompress the refrigerant flowing into the heat exchanger; and an outdoor expansion valve configured to decompress the refrigerant flowing into the outdoor heat exchanger, the vehicle air conditioning apparatus performing a heating and dehumidifying operation to release the heat from the refrigerant discharged from the compressor in the radiator; to decompress part of the refrigerant by the indoor expansion valve and absorb the heat into the refrigerant in the heat exchanger; and to decompress the remaining refrigerant by the outdoor expansion valve and absorb the heat into the remaining refrigerant in the outdoor heat exchanger, the vehicle air conditioning apparatus further comprising: an outdoor expansion valve controller configured to control an evaporating temperature of the refrigerant in the heat exchanger by regulating an opening of the outdoor expansion valve during the heating and dehumidifying operation; an evaporating temperature control valve provided in a refrigerant flow passage to an output side of the heat exchanger from which the refrigerant is discharged, and configured to control the evaporating temperature of the refrigerant in the heat exchanger by regulating an amount of the refrigerant flowing through the refrigerant flow passage; a temperature detector configured to detect a temperature of the refrigerant in the heat exchanger; and a control changer configured to change control of the evaporating temperature of the refrigerant in the heat exchanger from by regulating an opening of the outdoor expansion valve to by regulating an opening of the evaporating temperature control valve.

By this means, during the heating and dehumidifying operation, when the evaporating temperature of the refrigerant in the heat exchanger decreases under the control of the opening of the outdoor expansion valve, the evaporating temperature regulating valve can regulate the evaporating temperature of the refrigerant in the heat exchanger, it is possible to prevent the evaporating temperature of the refrigerant in the heat exchanger from decreasing by regulating not only the opening of the outdoor expansion valve but also the opening of the evaporating temperature regulating valve.

Effect of the Invention

According to the present invention, during the heating and dehumidifying operation, it is possible to prevent the evaporating temperature of the refrigerant in the heat exchanger from decreasing by controlling not only the opening of the outdoor expansion valve but also the opening of the evaporating temperature regulating valve. Therefore, when the outdoor temperature is low, a frost is not formed on the heat exchanger, and consequently it is possible to secure the required quantity of heat absorbed into the refrigerant in the heat exchanger.

DESCRIPTION OF EMBODIMENTS

FIG. 1 to FIG. 13 show Embodiment 1 of the present invention.

Figure 1:
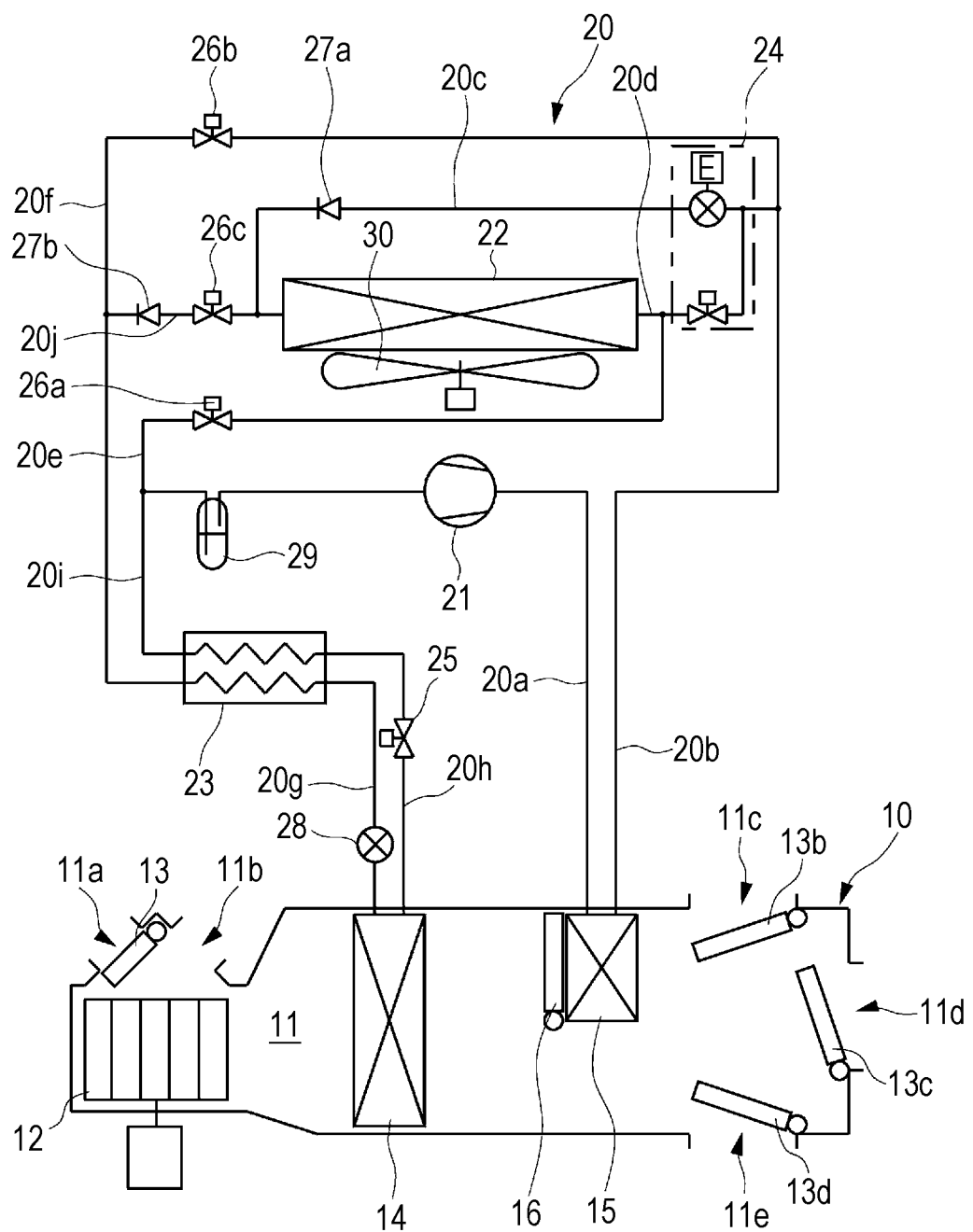
FIG. 1 is a schematic view showing a vehicle air conditioning apparatus according to Embodiment 1 of the present invention.

As shown in FIG. 1, the vehicle air conditioning apparatus according to the present invention includes an air conditioning unit 10 provided in the vehicle interior, and a refrigerant circuit 20 formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode."Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing therethrough and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; an indoor heat exchanger 23 configured to perform a heat exchange between the refrigerant flowing out of the heat exchanger 14 and the refrigerant flowing out of the radiator 15 and the outdoor heat exchanger 22, or at least of the radiator 15; a first control valve 24 including an expansion part configured to decompress the refrigerant flowing into the outdoor heat exchanger 22 during the heating operation, and a condensing pressure regulating part configured to regulate the condensing pressure of the refrigerant in the radiator during the cooling and dehumidifying operation; a second control valve 25 having a function as an evaporating pressure regulating part to regulate the evaporating pressure of the refrigerant in the heat exchanger 14; first to third solenoid valves 26a, 26b and 26c; first and second check valves 27a and 27b, an expansion valve 28 as an indoor expansion valve; and an accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 24 into which the refrigerant flows is connected to the output side of the radiator 15 from which the refrigerant is discharged, thereby to form the refrigerant flow passage 20b. The first end side of the outdoor heat exchanger 22 is connected to the output side of the expansion part of first control valve 24 from which the refrigerant is discharged, thereby to form the refrigerant flow passage 20c. The first check valve 27a is provided in the refrigerant flow passage 20c. Meanwhile, the second end side of the outdoor heat exchanger 22 is connected to the output side of the condensing pressure regulating part of the first control valve 24 from which the refrigerant discharged, thereby to form the refrigerant flow passage 20d. The suction side of the compressor 21 into which the refrigerant is sucked is connected to the second end side of the outdoor heat exchanger 22, in parallel with the refrigerant flow passage 20d, thereby to form the refrigerant flow passage 20e. The first solenoid valve 26a and the accumulator 29 are provided in the refrigerant flow passage 20e in the order from the upstream of the flow of the refrigerant. The input side of the indoor heat exchanger 23 into which a high-pressure refrigerant flows is connected to the refrigerant flow passage 20b, thereby to form the refrigerant flow passage 20f. The second solenoid valve 26b is provided in the refrigerant flow passage 20f. The input side of the heat exchanger 14 into which the refrigerant flows is connected to the output side of the indoor heat exchanger 23 from which the high-pressure refrigerant is discharged, thereby to form the refrigerant flow passage 20g. The expansion valve 28 is provided in the refrigerant flow passage 20g. The input side of the indoor heat exchanger 23 into which a low-pressure refrigerant flows is connected to the output side of the heat exchanger 14 from which the refrigerant is discharged, thereby to form the refrigerant flow passage 20h. The second control valve 25 is provided in the refrigerant flow passage 20h. The part of the refrigerant flow passage 20e between the first solenoid valve 26a and the accumulator 29 is connected to the output side of the indoor heat exchanger 23 from which the low-pressure refrigerant is discharged, thereby to form the refrigerant flow passage 20i. Part of the refrigerant flow passage 20f located downstream from the first check valve 27a in the refrigerant flow direction is connected to the first end side of the outdoor heat exchanger 22, in parallel with the refrigerant flow passage 20c, thereby to form the refrigerant flow passage 20j. The third solenoid valve 26c and the second check valve 27b are provided in the refrigerant flow passage 20j in the order from the upstream of the refrigerant flow direction.

The compressor 21 and the outdoor heat exchanger 22 are disposed outside the vehicle interior. The compressor 21 is driven by the electric motor 21a. The outdoor heat exchanger 22 includes an outdoor fan 30 configured to perform a heat exchange between the outdoor air and the refrigerant while the vehicle stops. The outdoor fan 30 is driven by the electric motor 30a.

In the first control valve 24, a refrigerant flow channel to the expansion part and a refrigerant flow channel to the condensing pressure regulating part are formed. The refrigerant flow channels to the expansion part and the condensing pressure regulating part can be completely closed by valves that regulate the openings of the refrigerant flow channels, respectively.

The opening of the second control valve 25 can be switched between two values, and therefore it is possible to regulate the amount of the refrigerant flowing through the refrigerant flow passage 20h in two values.

The expansion valve 28 is a temperature expansion valve used to properly maintain the superheat of the refrigerant flowing through the refrigerant flow passage 20h (in the output side of the heat exchanger from which the refrigerant is discharged).

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 2:
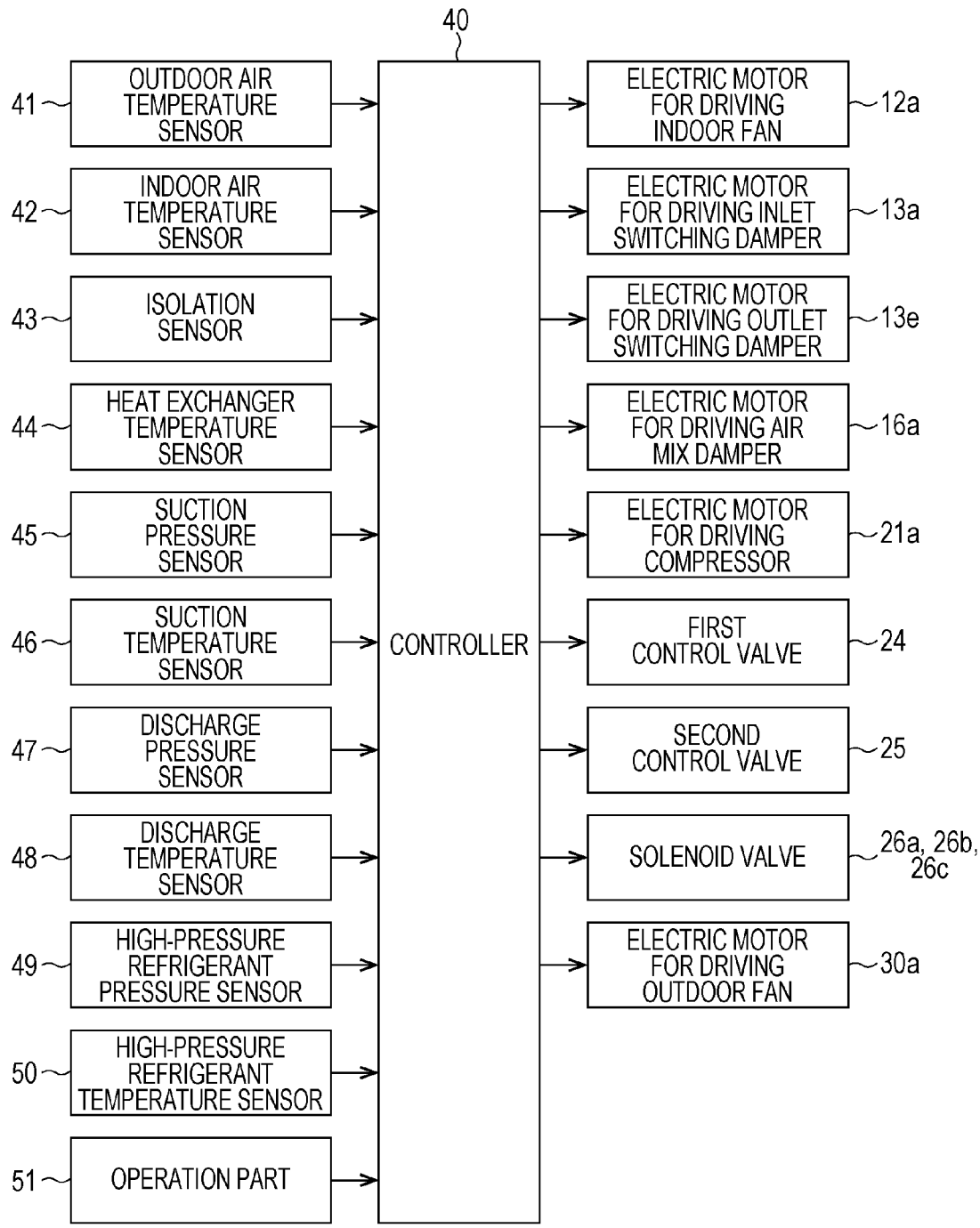
FIG. 2 is a block diagram showing a control system.

As shown in FIG. 2, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the first control valve 24; the second control valve 25; the first to third solenoid valves 26a, 26b and 26c and an electric motor 30a for driving the outdoor fan 30 are connected to the output side of the controller 40.

As shown in FIG. 2, an outdoor air temperature sensor 41 configured to detect temperature Tam outside the vehicle interior; an indoor air temperature sensor 42 configured to detect indoor air temperature Tr; an insolation sensor 43 such as a photo sensor configured to detect amount of insolation Ts; a heat exchanger temperature sensor 44 as a temperature detector configured to detect evaporating temperature Te of the refrigerant in the heat exchanger 14; a suction pressure sensor 45 configured to detect the pressure of the refrigerant sucked into the compressor; a suction temperature sensor 46 configured to detect the temperature of the refrigerant sucked into the compressor 21; a discharge pressure sensor 47 configured to detect the pressure of the refrigerant discharged from the compressor 21; a discharge temperature sensor 48 configured to detect the temperature of the refrigerant discharged from the compressor 21; a high-pressure refrigerant pressure sensor 49 configured to detect the pressure of a high-pressure refrigerant flowing through the refrigerant flow passage 20b; a high-pressure refrigerant temperature sensor 50 configured to detect the temperature of the high-pressure refrigerant flowing through the refrigerant flow passage 20b; and an operation part 49 configured to set modes regarding to target preset temperature Tset and the switching of the operation, are connected to the output side of the controller 40.

The vehicle air conditioning apparatus having the above-described configuration performs cooling operation, cooling and dehumidifying operation, heating operation, first heating and dehumidifying operation, and second heating and dehumidifying operation. Now, each operation will be explained.

Figure 3:
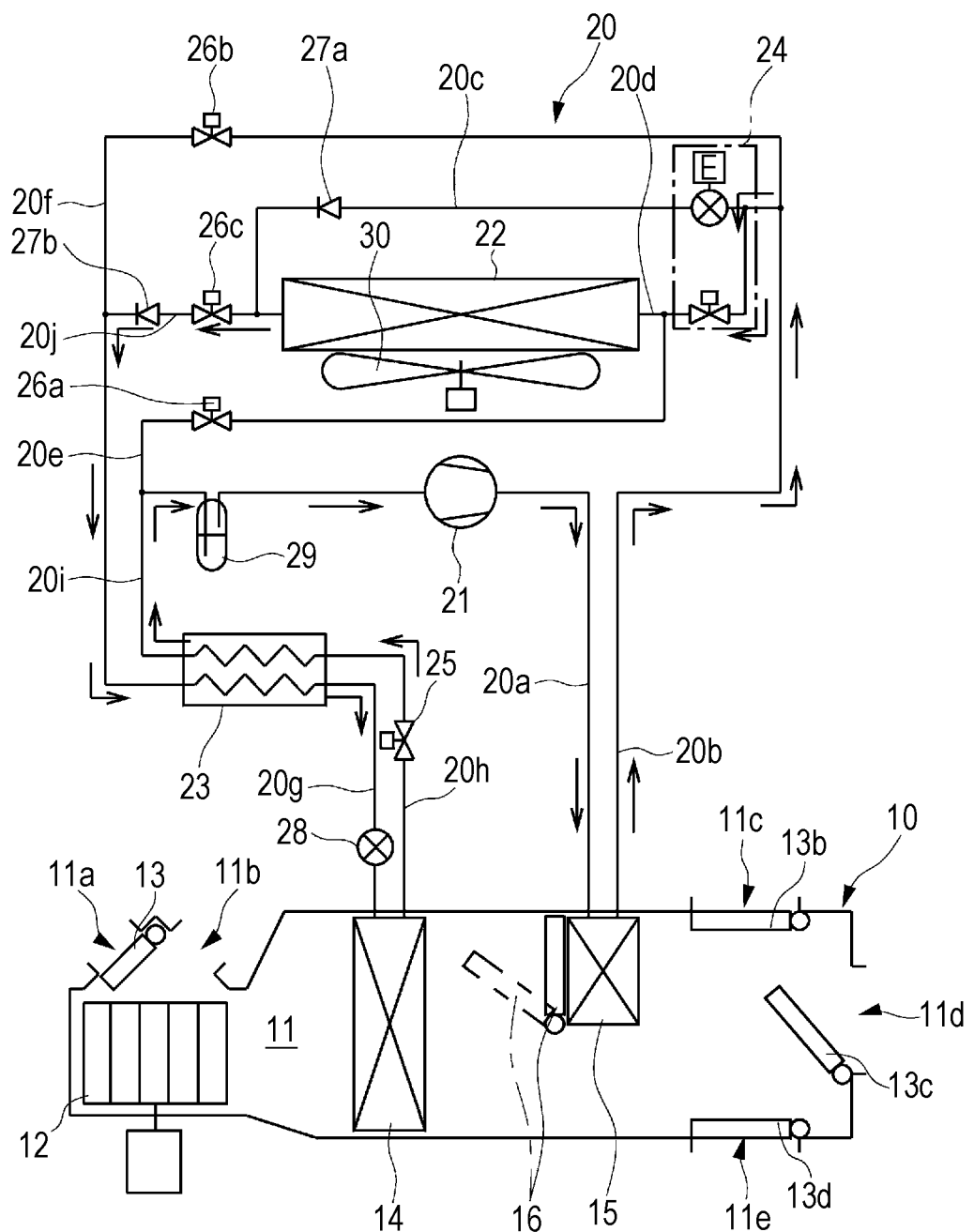
FIG. 3 is a schematic view showing the vehicle air conditioning apparatus performing a cooling operation and a cooling and dehumidifying operation.

During the cooling and dehumidifying operation, in the refrigerant circuit 20, the refrigerant flow channel to the expansion part is closed while the refrigerant flow channel to the condensing pressure regulating part is opened in the first control valve 24; the third solenoid valve 26c is opened; the first and second solenoid valves 26a and 26b are closed; and compressor 21 is operated. By this means, as shown in FIG. 3, the refrigerant discharged from the compressor 21 flows through in this order: the refrigerant flow passage 20a; the radiator 15; the refrigerant flow passages 20b and 20d; the outdoor heat exchanger 22, the refrigerant flow passages 20j and 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passages 20i and 20e, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as shown by the dashed-dotted line of FIG. 3, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO of the air to blowout of the outlets 11c, 11d and 11e to the vehicle interior in order to set the temperature of the vehicle interior to the target preset temperature Tset. The target air-blowing temperature TAO is calculated based on the preset temperature Tset, and environmental conditions including the outdoor air temperature Tam, the indoor air temperature Tr, and an amount of insolation Ts, which are detected by the outdoor air temperature sensor 41, the indoor air temperature sensor 42, and the insolation sensor 48, respectively.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 4:
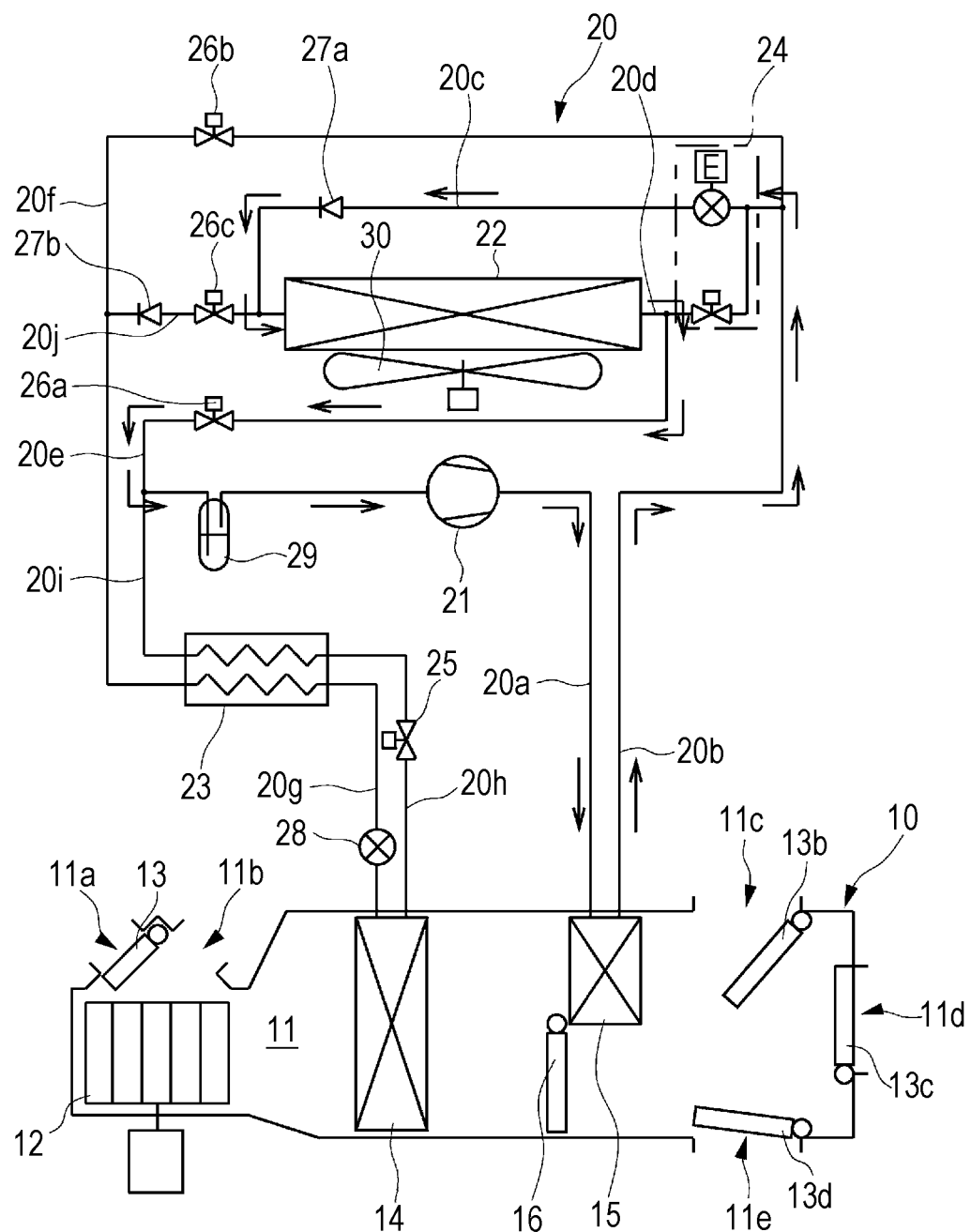
FIG. 4 is a schematic view showing the vehicle air conditioning apparatus performing a heating operation.

During the heating operation, in the refrigerant circuit 20, the refrigerant flow channel to the expansion part is opened while the refrigerant flow channel to the condensing pressure regulating part is closed in the first control valve 24; the first solenoid valve 26a is opened; the second and third solenoid valves 26b and 26c are closed; and the compressor 21 is operated. By this means, as shown in FIG. 4, the refrigerant discharged from the compressor 21 flows through in this order: the refrigerant flow passage 20a; the radiator 15; the refrigerant flow passages 20b and 20c; the outdoor heat exchanger 22; and the refrigerant flow passage 22e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 5:
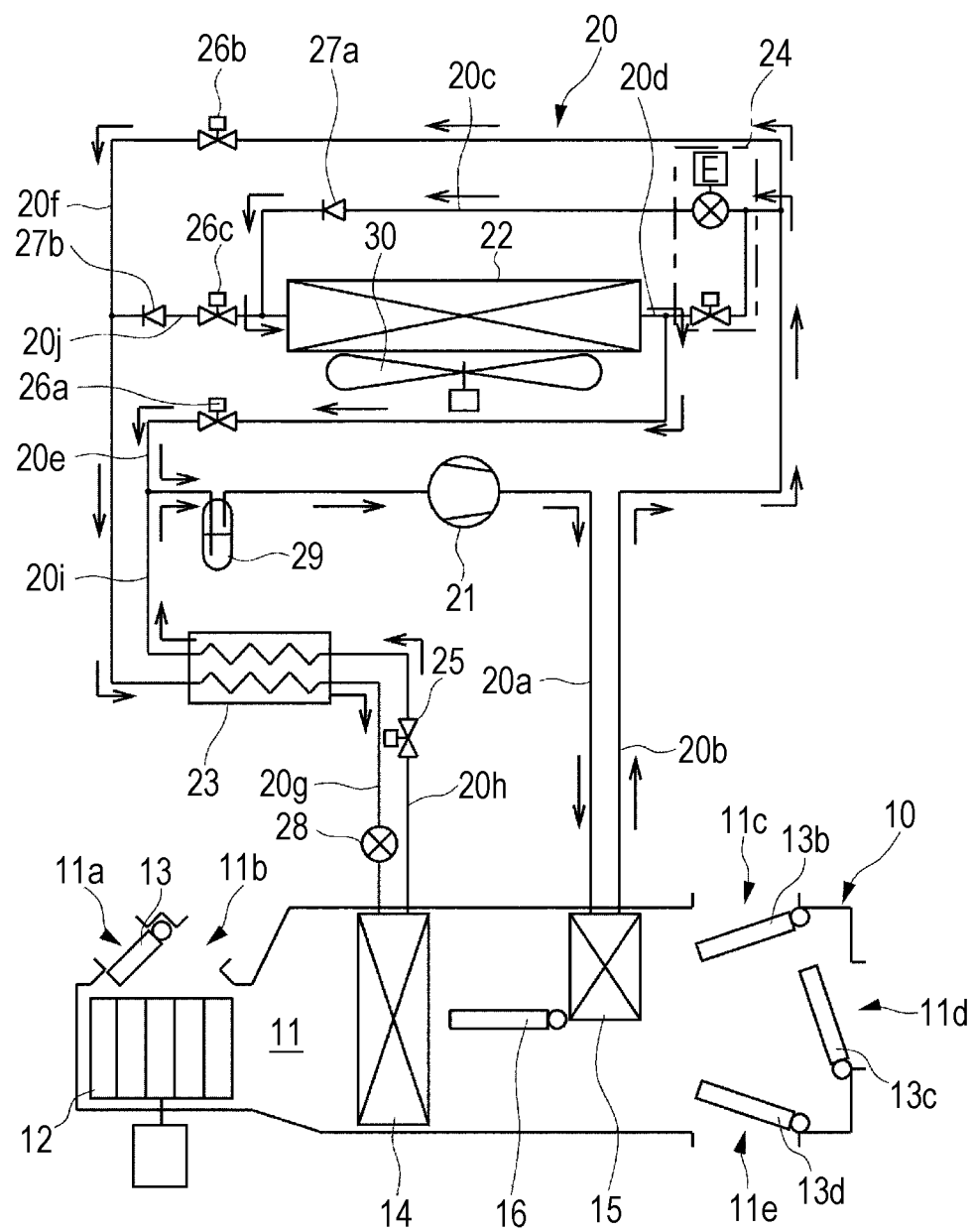
FIG. 5 is a schematic view showing the vehicle air conditioning apparatus performing a first heating and dehumidifying operation.

During the first heating and dehumidifying operation, in the refrigerant circuit 20, the refrigerant flow channel to the expansion part is opened while the refrigerant flow channel to the condensing pressure regulating part is closed in the first control valve 24; the first and second solenoid valves 26a and 26b are opened; the third solenoid valve 26c is closed; and the compressor 21 is operated. By this means, as shown in FIG. 5, the refrigerant discharged from the compressor 21 flows through in this order: the refrigerant flow passage 20a; the radiator 15; and the refrigerant flow passage 20b. Part of the refrigerant having passed through the refrigerant flow passage 20b flows through in this order: the first control valve 24; the refrigerant flow passage 20c; the outdoor heat exchanger 22; and the refrigerant flow passage 20e, and is sucked into the compressor 21. Meanwhile, the remaining refrigerant having passed through the refrigerant flow passage 20b flows through in this order: the refrigerant flow passage 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passage 20i, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 6:
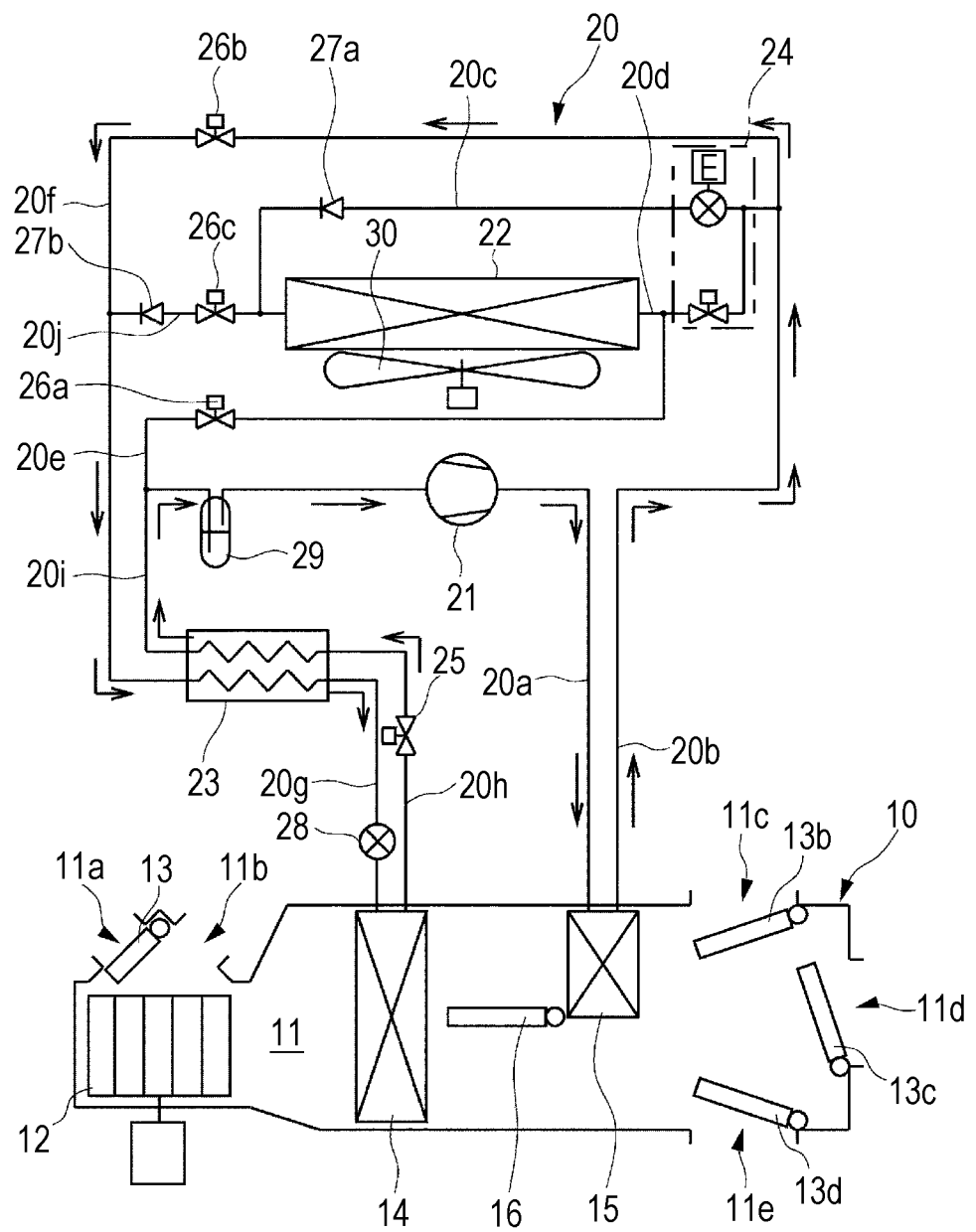
FIG. 6 is a schematic view showing the vehicle air conditioning apparatus performing a second heating and dehumidifying operation.
Figure 7:
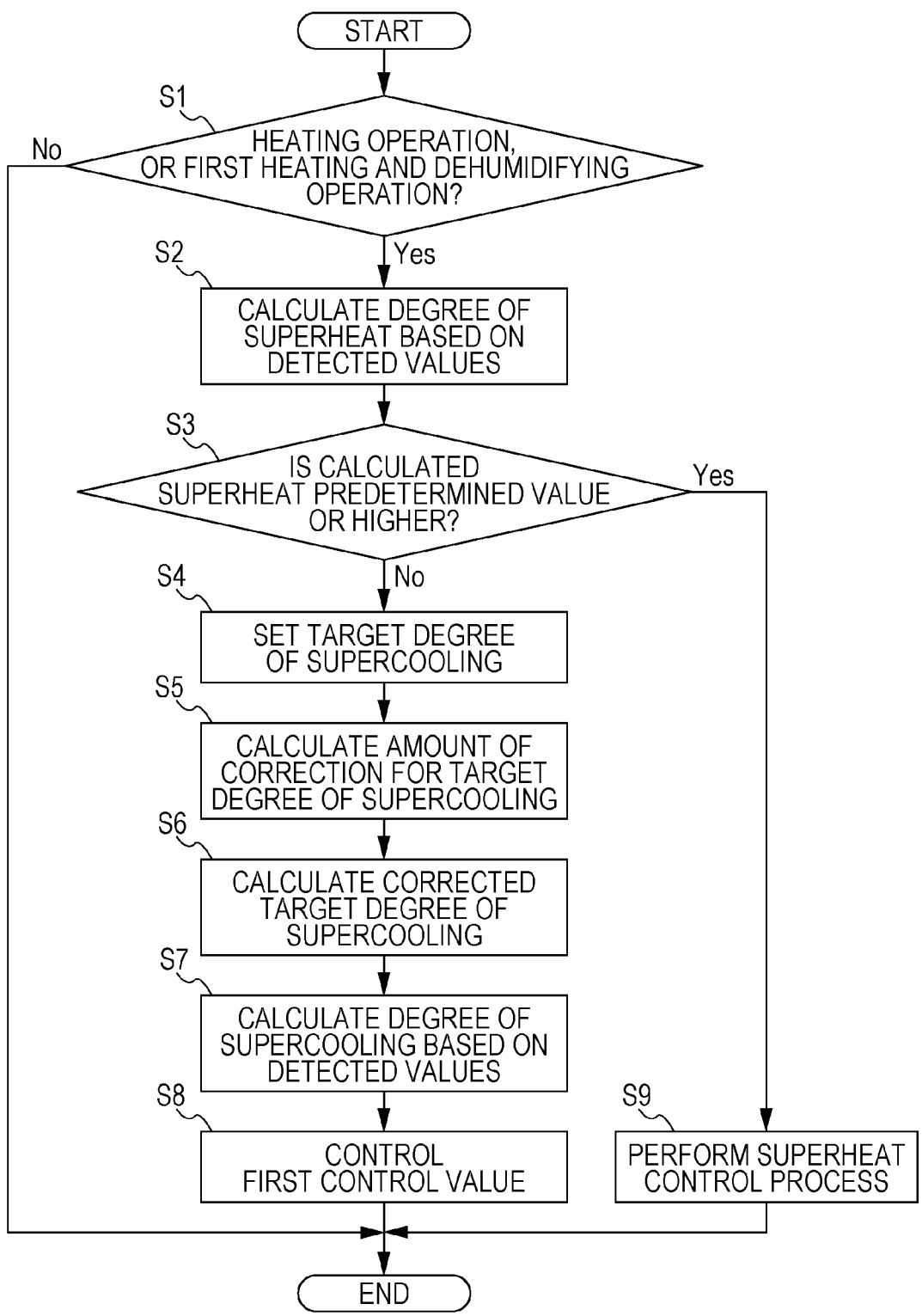
FIG. 7 is a flowchart showing an expansion part control process.
Figure 8:
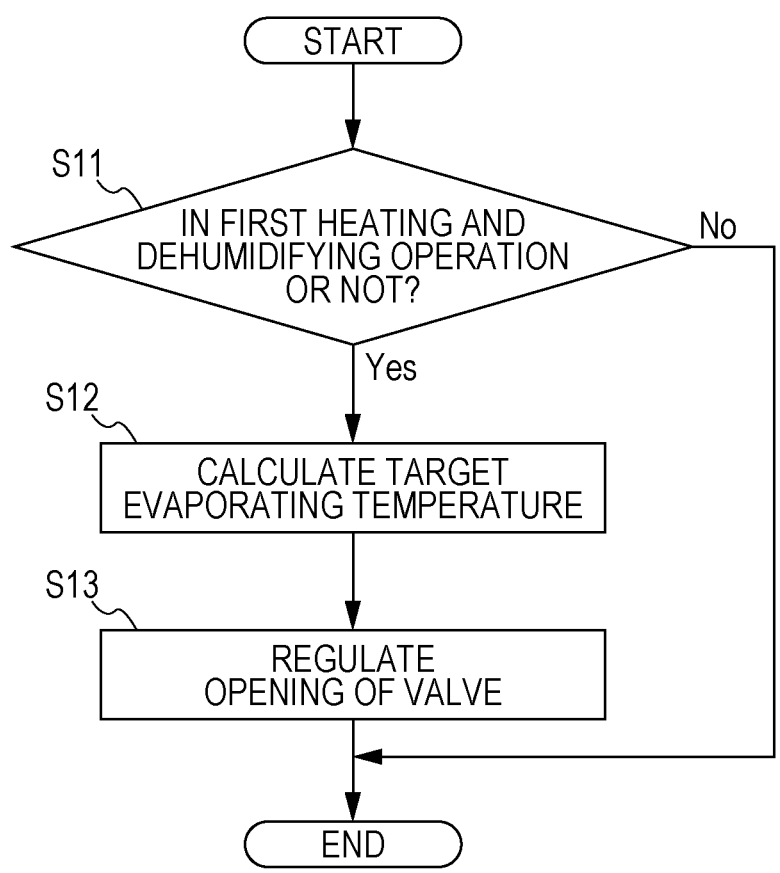
FIG. 8 is a flowchart showing second control valve control process.
Figure 9:
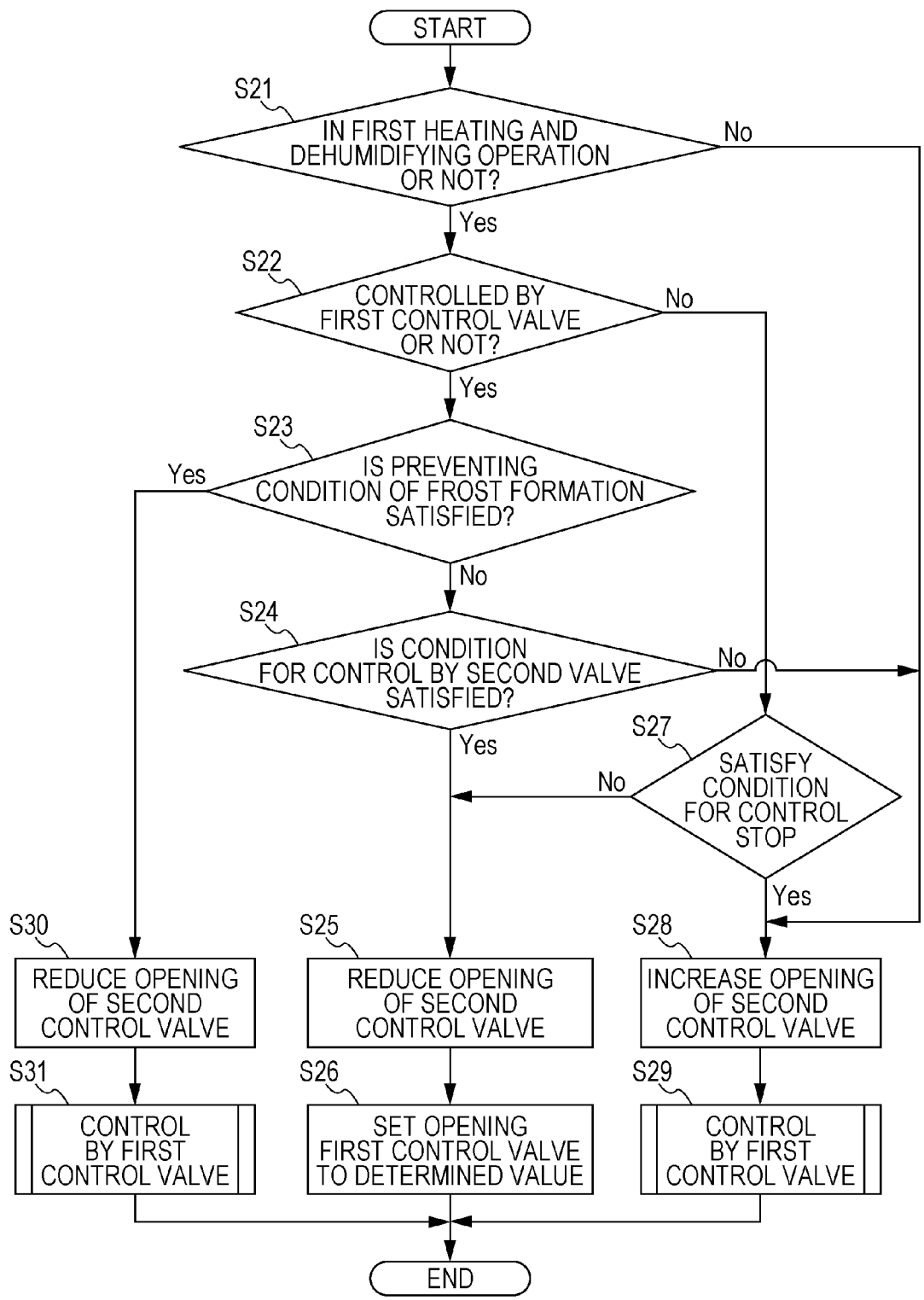
FIG. 9 is a flowchart showing an evaporating temperature control process.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26b is opened; and the first and third solenoid valves 26a and 26c are closed, and the compressor 21 is operated. By this means, as shown in FIG. 6, the refrigerant discharged from the compressor 21 flows through in this order: the refrigerant flow passage 20a; the radiator 15; the refrigerant flow passages 20b and 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passages 20i and 20e, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the controller 40 performs an operation switching control process to switch the operation among the cooling operation, the cooling and dehumidifying operation, the heating operation, the first heating and dehumidifying operation, and the second heating and dehumidifying operation, based on environmental conditions including the outdoor air temperature Tam, the indoor air temperature Tr, the outdoor air humidity, the indoor air humidity Th, the amount of insolation Ts and so forth.

The controller 40 switches the mode of the outlets 11c, 11d and 11e by using the outlet switching dampers 13b, 13c and 13d, and controls the opening of the air mix damper 16 in order to set the temperature of the air blowing out of the outlets 11c, 11d, and 11e to the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees Celsius, the controller 40 sets the foot mode. Meanwhile, when the target air-blowing temperature TAO is low, for example, lower than 25 degrees Celsius, the controller sets the vent mode. Moreover, when the target air-blowing temperature TAO is the temperature between the temperature for the foot mode and the temperature for the vent mode, the controller 40 sets the bi-level mode.

Moreover, during the heating operation and the first heating and dehumidifying operation, the controller 40 performs an expansion part control process to control the opening of the expansion part of the first control valve 24 based on the operation state. Now, the operation of the controller 40 in this process will be explained with reference to the flowchart shown in FIG. 7.

(Step S1)

In step S1, the CPU determines whether the operation is the heating operation or the first heating and dehumidifying operation. When determining that the operation is one of the heating operation and the first heating and dehumidifying operation, the CPU moves the step to step S2. On the other hand, when determining that the operation is neither the heating operation nor the first heating and dehumidifying operation, the CPU ends the expansion part control process.

(Step S2)

When determining that the operation is the heating operation or the first heating and dehumidifying operation in the step S1, the CPU calculates the degree of superheat SH of the refrigerant based on the pressure detected by the suction pressure sensor 45 and the temperature detected by the suction temperature sensor 46 in the step S2.

(Step S3)

In step S3, the CPU determines whether or not the superheat SH calculated in the step S2 is a predetermined value or higher. When determining that the superheat SH is the predetermined value or higher, the CPU moves the step to step S9. On the other hand, when determining that the superheat SH is not the predetermined value or higher, the CPU moves the step to step S4.

(Step S4)

In step S4, the CPU sets target degree of supercooling SCt based on the target air-blowing temperature TAO. For example, when the target air-blowing temperature TAO is a predetermined value (e.g. 60 degrees Celsius) or higher, the CPU sets first target degree of supercooling SCt1 (e.g. 15 degrees Celsius). On the other hand, when the target air-blowing temperature TAO is lower than the predetermined value, the CPU sets second target degree of supercooling SCt2 (e.g. 12 degrees Celsius).

(Step S5)

In step S5, for the target degree of supercooling SCt set in the step S4, the CPU calculates amount of correction H1 based on amount of air Qa supplied from the indoor fan 12 and amount of correction H2 based on amount of refrigerant Qr flowing through the refrigerant circuit 20. To be more specific, when the amount of air Qa supplied from the indoor fan 12 is a predetermined value or higher, the amount of correction H1 is zero. On the other hand, when the amount of air Qa is lower than the predetermined value, the amount of correction H1 (e.g. $-10 \leq H1 \leq 0$) is set to decrease the degree of supercooling SC according to the amount of air Qa. When the amount of refrigerant Qr flowing through the high-pressure side of the refrigerant circuit 20 is a predetermined value or higher, the amount of correction H2 (e.g. $0 \leq H2 \leq 5$) is set to increase the degree of supercooling according to the amount of refrigerant Qr. On the other hand, when the amount of refrigerant Qr is lower than the predetermined value, the amount of correction H2 (e.g. $-5 \leq H2 \leq 0$) is set to decrease the degree of supercooling SC according to a decrease in the amount of refrigerant Qr. The amount of refrigerant Qr flowing through the high-pressure side of the refrigerant circuit 20 increases as the pressure of the refrigerant in the high-pressure side of the refrigerant circuit 20 increases, and decreases as the pressure of the refrigerant decreases. Therefore, the amount of refrigerant Qr flowing through the high-pressure side of the refrigerant circuit 20 is calculated based on the pressure detected by the high-pressure refrigerant pressure sensor 49.

(Step S6)

In step S6, the CPU calculates corrected target degree of supercooling SCtc by adding the amount of correction H1 and the amount of correction H2 to the target degree of supercooling SCt (SCtc=SCt−(H1+H2)).

(Step S7)

In step S7, the CPU calculates the degree of supercooling SC of the refrigerant, based on the pressure detected by the high-pressure refrigerant pressure sensor 49 and the temperature detected by the high-pressure refrigerant temperature sensor 50.

(Step S8)

In step S8, the CPU controls the opening of the expansion part of the first control valve 24 such that the degree of supercooling SC is the corrected target degree of supercooling SCtc, and ends the expansion part control process.

(Step S9)

When determining that the superheat SH is the predetermined value or higher in the step S3, the CPU performs a superheat control process to control the opening of the expansion part of the first control valve 24 to set the superheat SH of the low-pressure refrigerant to target superheat SHt in step S9, and ends the expansion part control process.

In addition, the controller performs the process for regulating the second control valve to prevent the evaporating temperature of the refrigerant in the heat exchanger 14 from decreasing by regulating the opening of the second control valve 25 such that the opening of the second control valve 25 during the first heating and dehumidifying operation is equal to or lower than the opening during the other operations. Now, the operation of the controller 40 for this process will be explained with reference to the flowchart shown in FIG. 8.

(Step S11)

In step S11, the CPU determines whether or not the operation is the first cooling and dehumidifying operation. When determining that the operation is the first cooling and dehumidifying operation, the CPU moves the step to step S12. On the other hand, when determining that the operation is not the first cooling and dehumidifying operation, the CPU ends the second control valve control process.

(Step S12)

When determining that the operation is the first heating and dehumidifying operation in the step S11, the CPU calculates the target evaporating temperature Tat of the refrigerant in the heat exchanger 14, based on the target air-blowing temperature TAO.

(Step S13)

In step S13, the CPU regulates the opening of the second control valve 25, based on the target evaporating temperature Tat and the temperature Te detected by the heat exchanger temperature sensor 44, and ends the process for regulating the second control valve. To be more specific, when the temperature Te detected by the heat exchanger temperature sensor 44 is lower than the target evaporating temperature Tet, the opening of the second control valve 25 is set to the small one of the two openings. On the other hand, when the temperature Te detected by the heat exchanger temperature sensor 44 is higher than the target evaporating temperature Tet, the opening is set to the large one.

Moreover, during the first heating and dehumidifying operation, the controller 40 performs a process for switching evaporating temperature control to switch the control of the evaporating temperature of the refrigerant in the heat exchanger 14 between the regulation of the opening of the expansion part of the first control valve 24 and the regulation of the opening of the second control valve 15. The operation of the controller 40 in this process will be explained with reference to the timing charts shown in FIGS. 10 and 11.

(Step S21)

In step S21, the CPU determines whether or not the operation is the first heating and dehumidifying operation. When determining that the operation is the first heating and dehumidifying operation, the CPU moves the step to step S22. On the other hand, when determining that the operation is not the first heating and dehumidifying operation, the CPU moves the step to step S28.

(Step S22)

When determining that the operation is the first heating and dehumidifying operation in the step S21, the CPU determines whether or not the evaporating temperature of the refrigerant in the heat exchanger 14 is controlled by regulating the opening of the expansion part of the first control valve 24. When determining that the evaporating temperature is controlled by regulating the opening of the first control valve 24, the CPU moves the step to step S23.

On the other hand, when determining that the evaporating temperature is not controlled by regulating the opening of the first control valve, the CPU moves the step to step S27.

(Step S23)

When determining that the evaporating temperature is controlled by regulating the opening of the first control valve 24 in the step S22, the CPU determines whether or not a preventing condition of frost formation is satisfied in the step S23. When determining that the preventing condition of frost formation is satisfied, the CPU moves the step to step S30. On the other hand, when determining that the preventing condition of frost formation is not satisfied, the CPU moves the step to step S24. To be more specific, when a state in which the temperature detected by the heat exchanger temperature sensor 44 is lower than the temperature obtained by adding predetermined temperature Δd (e.g. 1 degree Celsius) to an estimated frost formation temperature at which a frost is formed on the heat exchanger 14 lasts for a predetermined period of time (0 to three seconds), the CPU determines that the preventing condition of frost formation is satisfied. The estimated frost formation temperature is calculated based on the humidity or dew point temperature of the air flowing through the air flow passage 11 and the amount of air supplied from the indoor fan 12.

(Step S24)

When determining that the preventing condition of frost formation is not satisfied in the step S23, the CPU determines whether or not a condition to regulate the evaporation temperature by regulating the opening of the second control valve 25 is satisfied. When determining that the condition is satisfied to start the control by the second control valve 25, the CPU moves the step to step S25. On the other hand, when determining that the condition is not satisfied to start the control by the second control valve 25, the CPU moves the step to step S28. To be more specific, as shown in FIG. 10, when the following state lasts for predetermined period of time T (0 to 3 seconds), the CPU determines that the condition to start the control by the second control valve 25 is satisfied: the opening of the expansion valve of the first control valve 24 is equal to or greater than a predetermined value (for example, fully open); and the temperature detected by the heat exchanger sensor 44 is lower than the temperature (Tat−ΔT1) obtained by subtracting predetermined temperature ΔT1 (e.g. 0.5 to 2 degrees Celsius) from the target evaporating temperature Tat (e.g. 1.5 to 12 degrees Celsius) of the refrigerant in the heat exchanger 14.

(Step S25)

Figure 10:
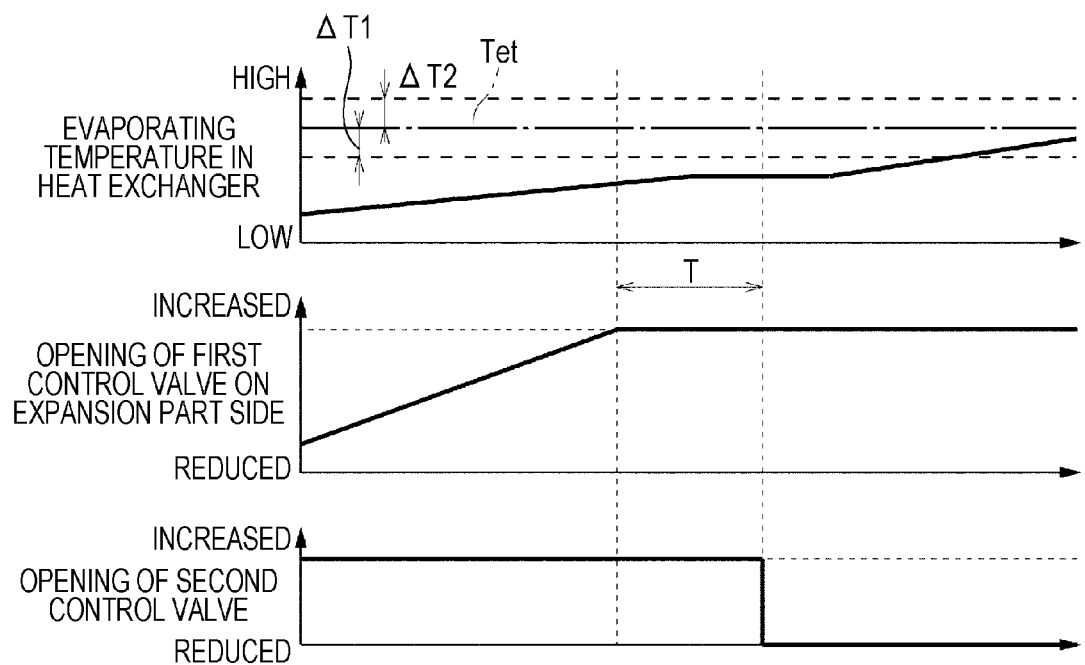
FIG. 10 is a timing chart for starting regulation of the opening of the second control valve.

When determining that the condition to start the control by the second control valve 25 is satisfied in the step 24, or, when determining that the condition to stop the control by the second control valve 25 is not satisfied in step S27 described later, the CPU reduces the opening of the second control valve 25 as shown in FIG. 10, and moves the step to step S26.

In the step S26, the CPU sets the opening of the expansion part of the first control valve 24 to a predetermined value (fully open in FIG. 10), and ends the process for switching the evaporating temperature control.

(Step S27)

Figure 11:
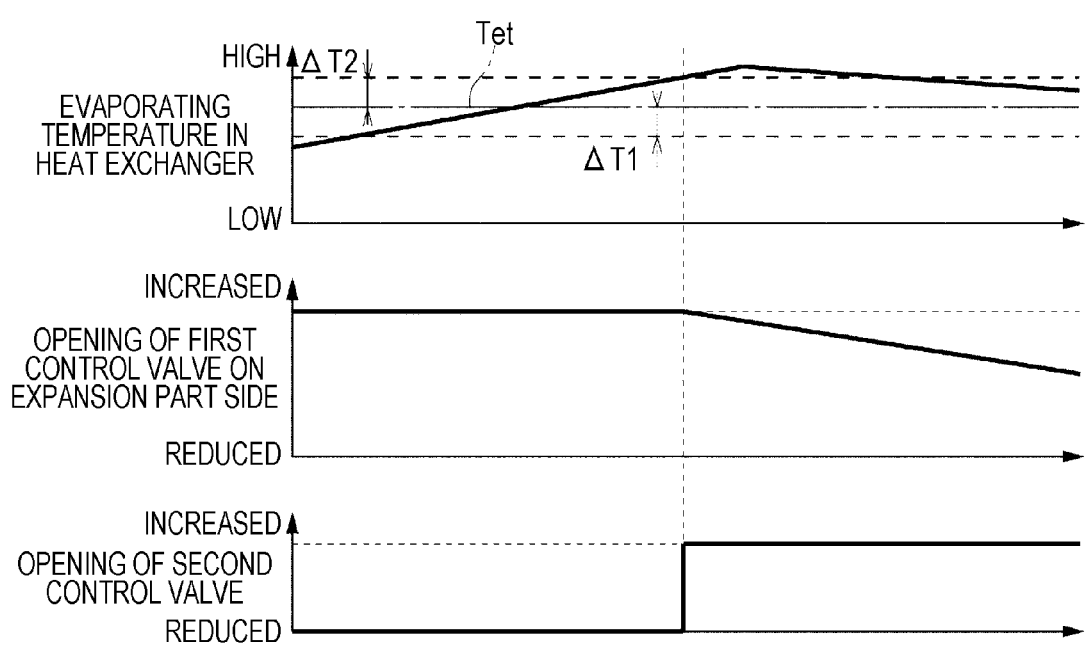
FIG. 11 is a timing chart for stopping regulation of the opening of the second control valve.

When determining that the evaporating temperature is controlled by the second control valve 25 in the step S25, the CPU determines whether or not a condition to stop the control by the second control valve 25 is satisfied in the step S27. When determining that the condition to stop the control by the second control valve is satisfied, the CPU moves the step to step S28. On the other hand, when determining that the condition to stop the control by the second control valve 25 is not satisfied, the CPU moves the step to the step S25. To be more specific, as shown in FIG. 11, when the temperature detected by the heat exchanger temperature sensor 44 is equal to or higher than a temperature (Tet+ΔT2) obtained by adding predetermined temperature ΔT2 to the target evaporating temperature Tat (e.g. 1.5 to 12 degrees Celsius) of the refrigerant in the heat exchanger 14, the CPU determines that the condition to stop the control by the second control valve 25 in the process of the control by the second control valve is satisfied. In addition, the CPU determines that the condition to stop the control by the second control valve 25 in the process of the control by the second control valve is satisfied in order to protect the refrigerant circuit 20 when any of the following conditions is met: the pressure detected by the suction pressure sensor 45 is equal to or lower than a predetermined pressure (0 to 0.05 MPaG); the pressure detected by the suction pressure sensor 47 is equal to or higher than a predetermined pressure (2 to 3 MPaG); and the temperature detected by the discharge temperature sensor 48 is equal to or higher than a predetermined temperature (120 to 130 degrees Celsius). Moreover, when the temperature detected by the suction temperature sensor 46 is lower than a predetermined temperature (1 to 2 degrees Celsius), the CPU determines that the condition to stop the control by the second control valve 25 is satisfied in order to prevent an decrease in the an amount of lubricating oil supplied to the compressor 21. The CPU may determine that the condition in which the amount of lubricating oil supplied to the compressor is not sufficient is satisfied, based on the temperature (degree of superheat) of the refrigerant in the output side of the accumulator 29 from which the refrigerant is discharged.

(Step S28)

When determining that the operation is not the first heating and dehumidifying operation in the step S21; when determining that the condition to start the control by the second control valve 25 is satisfied in the step S24; or when determining that the condition to stop the control by the second control valve 25 is satisfied in the step S27, the CPU increases the opening of the second control valve 25 as shown in FIG. 11, and moves the step to step S29.

(Step S29)

In the step S29, as shown in FIG. 11, the CPU starts a process for controlling the heat exchanger temperature by the first control valve 24 to control the evaporating temperature of the refrigerant in the heat exchanger 14 in the step S29 and ends the process for switching control of the evaporating temperature.

(Step S30)

When determining that the preventing condition of frost formation is satisfied in the step S23, the CPU reduces the opening of the second control valve 25 in the step S30, and moves the step to step S31.

(Step S31)

In the step S31, the CPU starts the process for controlling the heat exchanger temperature by the first control valve 24 to control the evaporating temperature in the heat exchanger 14, and ends the process for switching control of the evaporating temperature.

Figure 12:
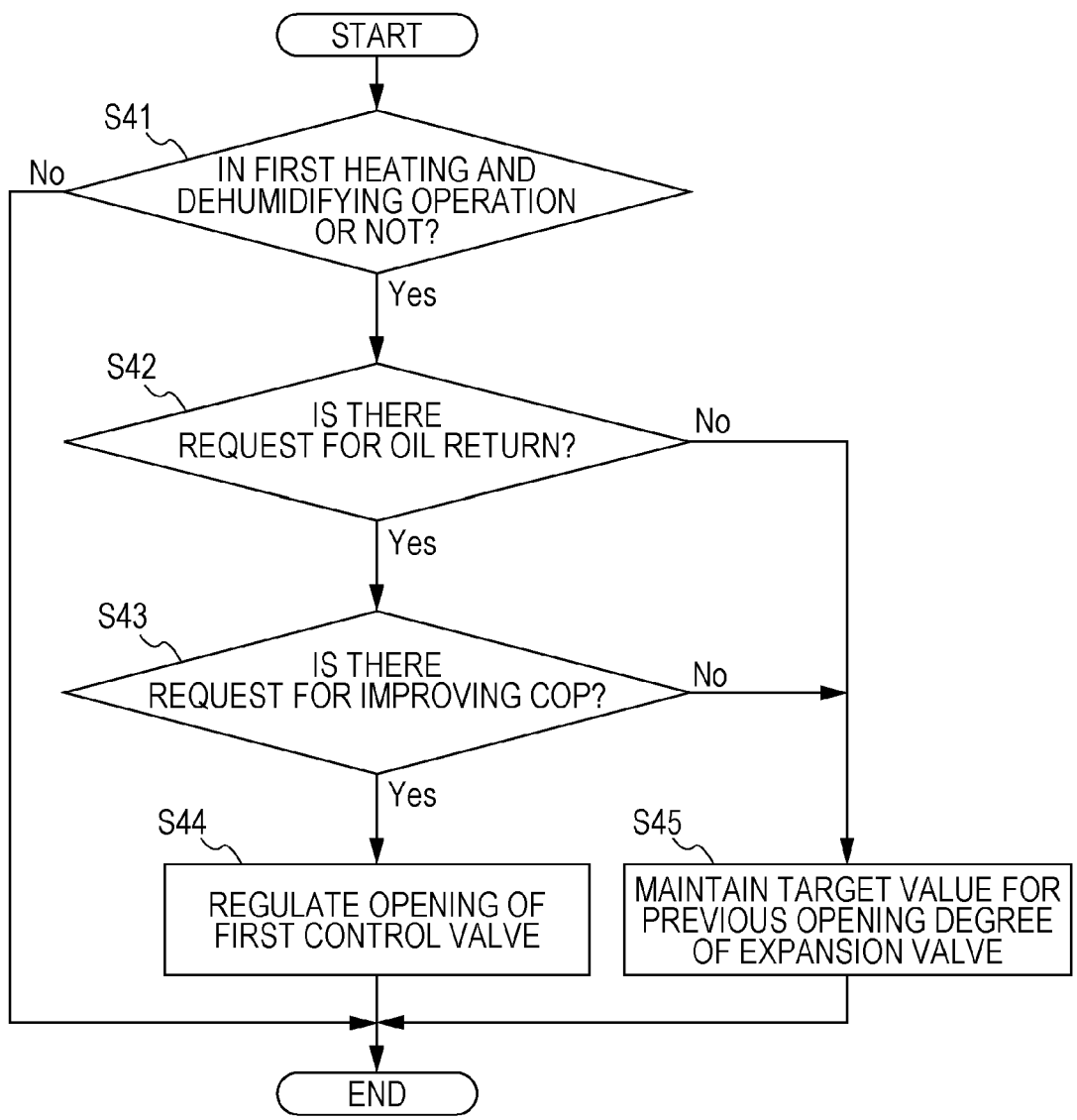
FIG. 12 is a flowchart showing a process for regulating the temperature of the first control valve of the heat exchanger by the first control valve.
Figure 13:
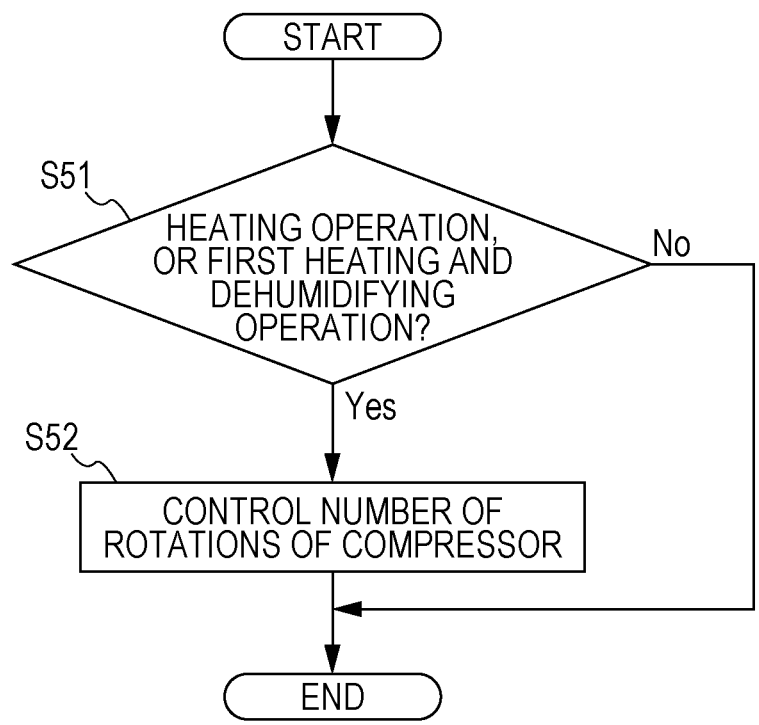
FIG. 13 is a flowchart showing a process for regulating the temperature of the radiator.

Next, the process for controlling the heat exchanger temperature by the first control valve will be explained with reference to the flowchart of FIG. 12.

(Step S41)

In step S41, the CPU determines whether or not the operation is the first heating and dehumidifying operation. When determining that the operation is the first heating and dehumidifying operation, the CPU moves the step to step S42. On the other hand, when determining that the operation is not the first heating and dehumidifying operation, the CPU ends the process for controlling the heat exchanger temperature by the first control valve.

(Step S42)

When determining that the operation is the first heating and dehumidifying operation in the step S41, the CPU determines whether or not there is a request for oil return in step S42. When determining that there is the request for oil return, the CPU moves the step to step S43. On the other hand, when determining that there is no request for oil return, the CPU moves the step to step S45. To be more specific, when the temperature (degree of superheat) SH_SUC of the refrigerant in the suction side of the compressor 21 is higher than a predetermined valve (e.g. 1 to 2 degrees Celsius), the CPU determines that there is a request for oil return. That is, as reducing the opening of the expansion part of the first control valve 24, the power consumption of the compressor 21 is reduced while the degree of superheat SH_SUC is increased. Therefore, to prevent the insufficiency the amount of lubricating oil supplied to the compressor 21, the degree of superheat of the refrigerant sucked into the compressor needs to be a predetermined value or lower, and therefore the upper limit of the refrigerant temperature (degree of superheat) SH_SUC is set.

(Step S43)

When determining that there is a request for oil return in the step S42, the CPU determines whether or not there is a request for improving COP. When determining that there is the request for improving COP, the CPU moves the step to step S44. On the other hand, when determining that there is no request for improving COP, the CPU moves the step to step S45. To be more specific, when pressure P_ODhex of the input side of the outdoor heat exchanger 22 into which the refrigerant flows is higher than refrigerant saturation pressure Psatu_Tamb corresponding to the outdoor temperature, the CPU determines that there is a request for improving COP. That is, as the opening of the expansion part of the first control valve 24 increases, the number of rotations of the compressor 21 increases while the pressure P_ODhex of the input side of the outdoor heat exchanger 22 into which the refrigerant flows increases. Therefore, to secure a quantity of heat absorbed into the refrigerant in the heat exchanger 14 during the first heating and dehumidifying operation, the pressure P_ODhex needs to be lower than the refrigerant saturation pressure Psatu_Tamb corresponding to the outdoor temperature.

(Step S44)

When determining that there is a request for improving COP in the step 43, the CPU calculates the target value of the opening of the expansion part of the first control valve 24 to regulate the opening in the step S44, and ends the process for controlling the heat exchanger temperature by the first control valve. To be more specific, target value TGECCV of the opening of the expansion part of the first control valve 24 is calculated as the following equation, based on proportional control output P_ECCV of the feedback target value, integral input control I_EECCV of the feedback target value, and the feedfoward target value FF_ECCV.

$$TGECCV = P\_ECCV + I\_ECCV + FF\_ECCV$$

Here, the proportional control output P_ECCV and the integral input control I_EECCV are calculated based on target heat exchanger temperature TEO and actual temperature Te of the heat exchanger 14, respectively (P_ECCV=Gp_ECCV×(TEO−Te), I_ECCV=Gi_ECCV×(TEO−Te)+I_ECCVz, where Gp is a constant as a proportional gain; Gi is a constant as an integral gain; and I_ECCVz is the previous value of the integral input control).

(Step S45)

When determining that there is no request for oil return in the step S42, or, when determining that there is no request for improving COP in the step S43, the CPU maintains the target value of the opening of the expansion part of the first control valve in the step S45, and ends the process for controlling the heat exchanger by the first control valve.

Moreover, the controller performs a process for controlling the radiator temperature to control the condensing temperature of the refrigerant in the radiator 15 by controlling the number of rotations of the compressor 21 during the heating operation or the first heating and dehumidifying operation. The operation of the controller in this process will be explained with reference to the flowchart of FIG. 13.

(Step 51)

In step S51, the CPU determines whether the operation is the heating operation or the first heating and dehumidifying operation. When determining that the operation is the heating operation or the first heating and dehumidifying operation, the CPU moves the step to step S52. On the other hand, when determining that the operation is not the heating operation or the first heating and dehumidifying operation, the CPU ends the process for controlling the radiator temperature.

(Step S52)

When determining that the operation is the heating operation or the first heating and dehumidifying operation in the step S51, the CPU calculates the target value of the number of rotations of the compressor 21 in step S52, and ends the process for controlling the radiator temperature. To be more specific, target value TGNCh of the number of rotations of the compressor 21 is calculated as the following equation, based on proportional input control P_TGNCh of a feedback target value, integral input control I_TGNCh of a feedback target value and feedfoward target value FF_TGNCh.

$$TGNCh = P\_TGNCh + I\_TGNCh + FF\_TGNCh$$

Here, the proportional control output P_TGNCh and the integral input control I_TGNCh are calculated based on target radiator temperature TCO and actual temperature Th of the radiator 15, respectively (P_TGNCh=Gp_TGNCh×(TCO−Th), I_TGNCh=Gi_TGNCh×(TCO−Th)+I_TGNChz, Gp_TGN, where Gp_TGN is a constant as a proportional gain; Gi_TGNCh is a constant as an integral gain; and I_TGNChz is the previous value of the integral input control).

As described above, with the vehicle air conditioning apparatus according to the present embodiment, the control of the evaporating temperature in the heat exchanger 14 is changed from by regulating the opening of the expansion part of the first control valve 24 to by regulating the opening of the second control value 25. By this means, during the first heating and dehumidifying operation, it is possible to prevent a decrease in the evaporating temperature of the refrigerant in the heat exchanger 14 by regulating the opening of not only the first control valve 24 but also the second control valve 25. Therefore, a frost is not formed on the heat exchanger 14 even if the outdoor temperature is low, and consequently it is possible to secure a required quantity of heat absorbed into the refrigerant in the heat exchanger 14

In addition, the control of the evaporating temperature of the refrigerant in the heat exchanger 14 is changed from by regulating the opening of the expansion part of the first control valve 24 to by regulating the opening of the second control valve if the opening of the expansion part of the first control valve 24 is equal to or greater than a predetermined value (for example, fully open) and the temperature detected by the heat exchanger temperature sensor 44 is lower than a predetermined value (Tat−ΔT1). By this means, it is possible to detect the situation in which it is not possible to prevent a decrease in the evaporating temperature of the refrigerant in the heat exchanger 14 by regulating the opening of the expansion part of the first control valve 24. Therefore, it is possible to start regulating the opening of the second control value 25 at an appropriate timing.

Moreover, while the evaporating temperature of the refrigerant in the heat exchanger is controlled by regulating the opening of the second control valve 25, the opening of the expansion part of the first control valve 24 is set to a predetermined value. This prevents loss of control such as hunching caused by regulating the opening of the expansion part of the first control valve 24 and regulating the opening of the second control valve 25 at a time, and therefore it is possible to secure necessary controllability.

Moreover, the control of the evaporating temperature of the refrigerant in the heat exchanger 14 is changed from by regulating the opening of the second control valve 25 to by regulating the opening of the expansion part of the first control valve 24, based on the temperature detected by the heat exchanger temperature sensor 44. By this means, it is possible to control the evaporating temperature of the refrigerant in the heat exchanger 14 usually by regulating the opening of the first control valve 24. Therefore, it is possible to simplify the control system, and consequently to reduce the manufacturing cost.

Moreover, the control of the evaporating temperature of the refrigerant in the heat exchanger 14 is changed from by regulating the opening of the second control valve 25 to by regulating the opening of the expansion valve of the first control valve 24, based on the temperature detected by the heat exchanger temperature sensor 44 and the target evaporating temperature Tat of the refrigerant in the heat exchanger 14. By this means, it is possible to control the evaporating temperature of the refrigerant in the heat exchanger 14 usually by regulating the opening of the first control valve 24, and consequently to simplify the configuration of the control system and reduce the manufacturing cost.

Furthermore, the control of the evaporating temperature of the refrigerant in the heat exchanger 14 is changed from by regulating the opening of the second control valve 25 to by regulating the opening of the expansion part of the first control valve 24 when any of the following condition is satisfied: the pressure detected by the suction pressure sensor 45 is equal to or lower than a predetermined pressure (0 to 0.05 MPaG); the pressure detected by the discharge pressure sensor 47 is equal to or higher than a predetermined pressure (2 to 3 MPaG); and the temperature detected by the discharge temperature sensor 48 is equal to or higher than a predetermined temperature (120 to 130 degrees Celsius). By this means, it is possible to prevent the pressure in the refrigerant circuit 20 from abnormally increasing or decreasing.

Here, with the present embodiment, a configuration has been described where, during the heating operation and the first heating and dehumidifying operation, the refrigerant flowing out of the compressor 21 flows through the outdoor heat exchanger 22 from the first end to the second end. It is by no means limiting. For example, during the heating operation and the first heating and dehumidifying operation, the refrigerant flowing out of the compressor 21 may flow through the outdoor heat exchanger 22 from the second end side to the first end side as shown in FIG. 12.

Figure 14:
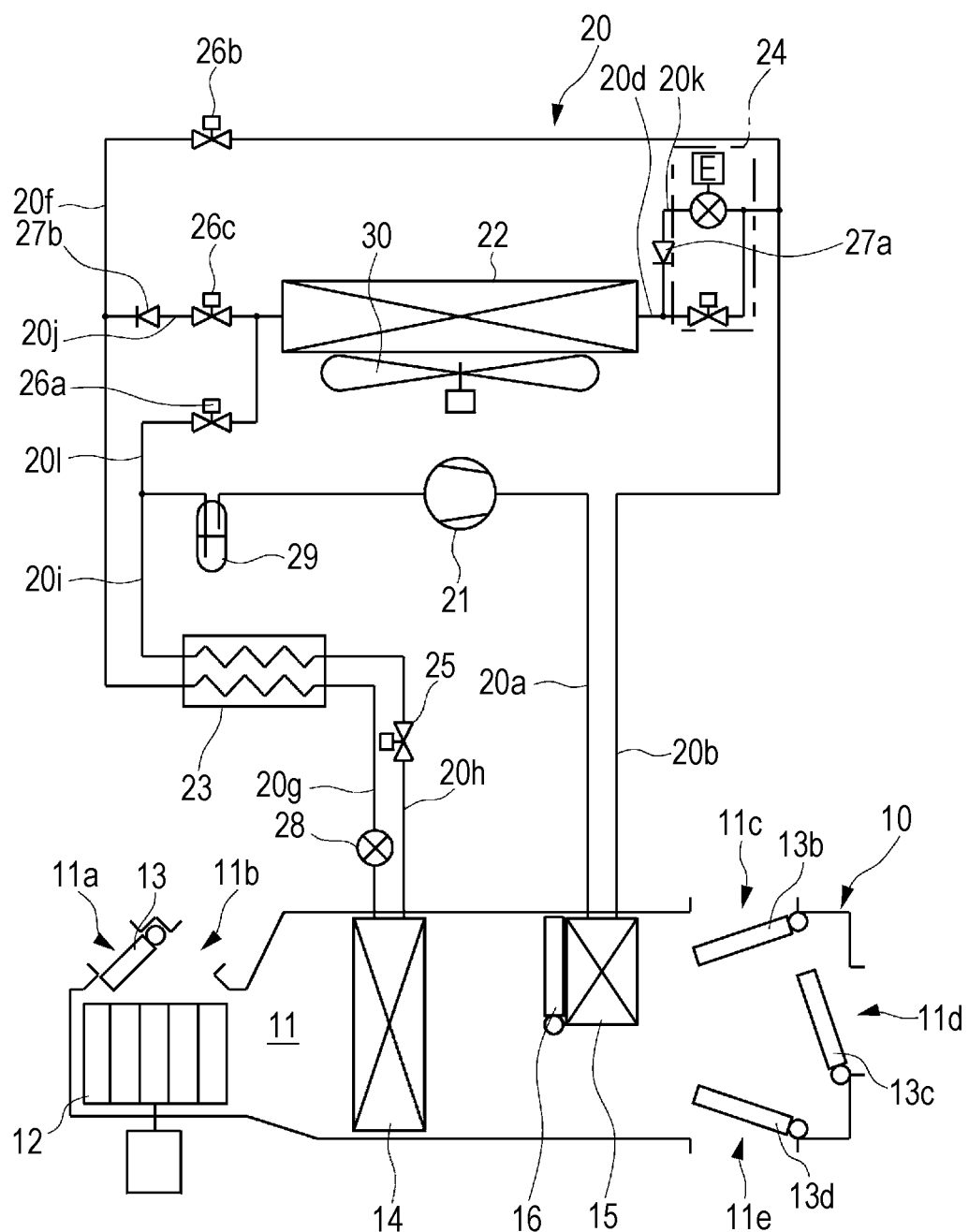
FIG. 14 is a schematic view showing another vehicle air conditioning apparatus according to the present invention.

In the vehicle air conditioning apparatus shown in FIG. 14, a refrigerant flow passage 20k is provided to connect between the output side of the expansion part of the first control valve 24 from which the refrigerant is discharged and the second end side of the outdoor heat exchanger 22, instead of the refrigerant flow passage 20c in Embodiment 1. In addition, in the vehicle air conditioning apparatus, a refrigerant flow passage 20l is provided to connect between the first end side of the outdoor heat exchanger 22 and the suction side of the compressor 21 into which the refrigerant is sucked, instead of the refrigerant flow passage 20e in Embodiment 1.

In the vehicle air conditioning apparatus having the above-described configuration, during the heating operation and the first heating and dehumidifying operation, the refrigerant flowing out of the radiator 15 flows through the outdoor heat exchanger 22 from the second end side to the first end side unlike Embodiment 1. During the other operations, the refrigerant flows in the same way as in Embodiment 2.

Moreover, with the embodiment, the expansion valve 28 has been described as a temperature expansion valve. However, it is by no means limiting, but an electronic expansion valve having a variable opening is applicable.

Moreover, with the embodiment, a configuration has been explained where the expansion part of the first control valve 24 us fully open while the opening of the second control valve 25 is regulated. However, it is by no means limiting. For example, the opening of the expansion part of the first control valve 24 may be 90% while the opening of the second control valve 25 is regulated.

Moreover, the opening of the expansion part of the first control valve 24, which is the requirement to start regulating the opening of the second control valve 25, is not limited to "full" but may be 90%.

Furthermore, with the embodiment, a configuration has been explained where the opening of the expansion part of the first control valve 24 is set to a predetermined value while the opening of the second control valve 25 is regulated. However, it is by no means limiting. For example, while the opening of the second control valve 25 is regulated, the opening of the expansion part of the first control valve 24 may be set to a valve determined according to the operation condition such as the outdoor temperature Tam or target air-blowing temperature TAO. In this case, it is possible to more accurately control the evaporating temperature of the refrigerant in the heat exchanger 14, and therefore to improve the controllability.

Moreover, with the embodiment, a configuration has been described where the control of the evaporating temperature of the refrigerant in the heat exchanger 14 is changed from by regulating the opening of the expansion part of the first control valve 24 to by regulating the opening of the second control valve 25 when the following condition lasts for the predetermined period of time T: the opening of the expansion part of the first control valve 24 is equal to or greater than a predetermined value; and the temperature detected by the heat exchanger temperature sensor 44 is lower than the temperature (Tet−ΔT1) obtained by subtracting the predetermined temperature ΔT1 from the target evaporating temperature Tat of the refrigerant in the heat exchanger 14. Here, the predetermined period of time includes 0 second.

Moreover, with the embodiment, a configuration has been described where the regulation of the second control value 25 in the second control valve regulation process is stopped when the temperature detected by the heat exchanger temperature sensor 44 is equal to or higher than the temperature (Tet+ΔT2) obtained by adding the predetermined temperature ΔT2 to the target evaporating temperature Tat of the refrigerant in the heat exchanger 14. However, it is by no means limiting. For example, the regulation of the second control valve in the second control valve regulation process may be stopped when the temperature detected by the heat exchanger temperature sensor 44 is equal to or higher than the target evaporating temperature Tat of the refrigerant in the heat exchanger 14.

Moreover, with the embodiment, a configuration has been described where the first control valve 24 includes the expansion part configured to decompress the refrigerant flowing into the outdoor heat exchanger 22 during the heating operation and the condensing pressure regulating part configured to regulate the condensing pressure of the refrigerant in the radiator during the heating and dehumidifying operation, which are integrally formed. However, it is by no means limiting. For example, an electronic expansion valve as the expansion part and a condensing pressure regulating value as the condensing pressure regulating part may be connected in parallel to the upstream side of the outdoor heat exchanger 22 in the refrigerant flow direction. That can produce the same effect as in the embodiment.

Moreover, with the embodiment, a configuration has been described where the opening of the second control valve 25 can be set to two values to regulate the amount of the refrigerant flowing through the refrigerant flow passage 20h in two stages. However, it is by no means limiting. For example, the opening of the second control valve 25 may be set to an any value. In this case, it is possible to optionally set a quantity of heat absorbed into the refrigerant in the heat exchanger 14, and therefore it is possible to improve the accuracy of the control of the quantity of heat absorbed into the refrigerant in the heat exchanger 14.

Moreover, with the embodiment, a configuration has been described where the opening of the second control valve 25 is regulated based on the target evaporating temperature Tet and the temperature Te of the heat exchanger temperature sensor 44. However, it is by no means limiting. For example, another configuration is possible where the temperature of air and the pressure after a heat exchange in the heat exchanger 14 are detected, and the opening of the second control valve 25 is regulated based on the result of the detection. This can produce the same effect as in the embodiment.

With the embodiment, during the heating and dehumidifying operation, the evaporating temperature of the refrigerant in the heat exchanger 14 is controlled by the first control valve 24 and the second control valve 25. Meanwhile, during the cooling and dehumidifying operation, the condensing pressure of the refrigerant in the radiator 15 is controlled by the first control, and the evaporating temperature of the refrigerant in the heat exchanger 14 is controlled by the heat exchanger 14. In this case, the condensing pressure of the refrigerant in the radiator 15 and the evaporating temperature of the refrigerant in the heat exchanger 14 is feedback-controlled based on the difference between the target condensing temperature and the detected temperature and the difference between the target evaporating temperature and the detected temperature. In addition, the number of rotations of the compressor 21 is set based on at least one of the temperature of the refrigerant discharged from the compressor 21, the opening of the second control valve 25 and the opening of the first control valve 24. Moreover, during the cooling and dehumidifying operation, the condensing temperature of the refrigerant in the radiator 15 may be controlled by controlling the number of rotations of the compressor 21 while the evaporating temperature of the refrigerant in the heat exchanger 14 may be controlled by regulating the opening of the second control valve 25. In this case, the condensing temperature of the refrigerant in the radiator 15 and the evaporating temperature of the refrigerant in the heat exchanger 14 may be feedback-controlled based on the difference between the target condensing temperature and the detected temperature and the difference between the target evaporating temperature and the detected temperature. Furthermore, the opening of the first control valve 24 may be set at least one of a preset value, the condensing temperature of the refrigerant in the radiator 15 and an amount of air supplied from the indoor fan 12.

REFERENCE SIGNS LIST 10 air conditioning unit
14 heat exchanger
15 radiator
20 refrigerant circuit
21 compressor
22 outdoor heat exchanger
24 first control valve
25 second control valve
26a to 26c first to third solenoid valve
27a and 27b first and second check valve
28 expansion valve
29 accumulator
40 controller
41 outdoor air temperature sensor
42 indoor air temperature sensor
43 insolation sensor
44 heat exchanger temperature sensor
45 suction pressure sensor
46 suction temperature sensor
47 discharge pressure sensor
48 discharge temperature sensor
51 operation part

The invention claimed is:
1. A vehicle air conditioning apparatus comprising:
a compressor configured to compress and discharge a refrigerant;
a radiator provided in a vehicle interior and configured to release heat from the refrigerant;
a heat exchanger provided in the vehicle interior and configured to absorb the heat into the refrigerant;
an outdoor heat exchanger provided outside the vehicle interior and configured to release the heat from the refrigerant or absorb the heat into the refrigerant;
an indoor expansion valve configured to decompress the refrigerant flowing into the heat exchanger; and
an outdoor expansion valve configured to decompress the refrigerant flowing into the outdoor heat exchanger, the vehicle air conditioning apparatus performing a heating and dehumidifying operation to release the heat from the refrigerant discharged from the compressor in the radiator; to decompress part of the refrigerant by the indoor expansion valve and absorb the heat into the refrigerant in the heat exchanger; and to decompress a remaining refrigerant by the outdoor expansion valve and absorb the heat into the remaining refrigerant in the outdoor heat exchanger, the vehicle air conditioning apparatus further comprising:

an outdoor expansion valve controller configured to control an evaporating temperature of the refrigerant in the heat exchanger by regulating an opening of the outdoor expansion valve during the heating and dehumidifying operation;

an evaporating temperature control valve provided in a refrigerant flow passage to an output side of the heat exchanger from which the refrigerant is discharged, and configured to control the evaporating temperature of the refrigerant in the heat exchanger by regulating an amount of the refrigerant flowing through the refrigerant flow passage;

a temperature detector configured to detect a temperature of the refrigerant in the heat exchanger; and a control changer configured to switch control of the evaporating temperature of the refrigerant in the heat exchanger from regulating an opening of the outdoor expansion valve to regulating an opening of the evaporating temperature control valve, when a predetermined condition in which the opening of the outdoor expansion valve is a predetermined value or more and the temperature detected by the temperature detector is a predetermined temperature or lower is satisfied.

2. The vehicle air conditioning apparatus according to claim 1, further comprising a valve opening setter configured to set the opening of the outdoor expansion valve to a predetermined value while the evaporating temperature of the refrigerant in the heat exchanger is controlled by the evaporating temperature control valve.

3. The vehicle air conditioning apparatus according to claim 1, further comprising a valve opening setter configured to set the opening of the outdoor expansion valve to a value determined on that a predetermined requirement is met while the evaporating temperature of the refrigerant in the heat exchanger is controlled by the evaporating temperature control valve.

4. The vehicle air conditioning apparatus according to claim 1, further comprising:

an operation condition detector configured to detect an operation condition of the compressor;

wherein the control changer is configured to switch the control of the evaporating temperature of the refrigerant in the heat exchanger from regulating the opening of the evaporating temperature control valve to regulating the opening of the outdoor expansion valve, based on the operation condition of the compressor detected by the operation condition detector.

5. The vehicle air conditioning apparatus according claim 1, further comprising a radiator temperature controller configured to control the temperature of the refrigerant in the radiator by controlling a number of rotations of the compressor.

6. The vehicle air conditioning apparatus according to claim 1, further comprising:

a frost formation estimator configured to estimate a temperature at which a frost is formed on the heat exchanger; and a controller configured to control the evaporating temperature of the refrigerant in the heat exchanger by regulating the opening of the evaporating temperature control valve, based on the temperature detected by the temperature detector and the temperature estimated by the frost formation estimator.

7. The vehicle air conditioning apparatus according to claim 1, further comprising:

a sucked refrigerant temperature detector configured to detect the temperature of the refrigerant sucked into the compressor;

wherein the control changer is configured to switch the control of the evaporating temperature of the refrigerant in the heat exchanger from regulating the opening of the evaporating temperature control valve to regulating the opening of the outdoor expansion valve, based on the temperature detected by the sucked refrigerant detector.

8. A vehicle air conditioning apparatus comprising:

a compressor configured to compress and discharge a refrigerant;

a radiator provided in a vehicle interior and configured to release heat from the refrigerant;

a heat exchanger provided in the vehicle interior and configured to absorb the heat into the refrigerant;

an outdoor heat exchanger provided outside the vehicle interior and configured to release the heat from the refrigerant or absorb the heat into the refrigerant;

an indoor expansion valve configured to decompress the refrigerant flowing into the heat exchanger; and an outdoor expansion valve configured to decompress the refrigerant flowing into the outdoor heat exchanger, the vehicle air conditioning apparatus performing a heating and dehumidifying operation to release the heat from the refrigerant discharged from the compressor in the radiator; to decompress part of the refrigerant by the indoor expansion valve and absorb the heat into the refrigerant in the heat exchanger; and to decompress a remaining refrigerant by the outdoor expansion valve and absorb the heat into the remaining refrigerant in the outdoor heat exchanger, the vehicle air conditioning apparatus further comprising:

an outdoor expansion valve controller configured to control an evaporating temperature of the refrigerant in the heat exchanger by regulating an opening of the outdoor expansion valve during the heating and dehumidifying operation;

an evaporating temperature control valve provided in a refrigerant flow passage to an output side of the heat exchanger from which the refrigerant is discharged, and configured to control the evaporating temperature of the refrigerant in the heat exchanger by regulating an amount of the refrigerant flowing through the refrigerant flow passage;

a temperature detector configured to detect a temperature of the refrigerant in the heat exchanger; and a control changer configured to switch control of the evaporating temperature of the refrigerant in the heat exchanger from regulating an opening of the evaporating temperature control valve to regulating an opening of the outdoor expansion valve, based on the temperature detected by the temperature detector.

9. The vehicle air conditioning apparatus according claim 8, further comprising a radiator temperature controller configured to control the temperature of the refrigerant in the radiator by controlling a number of rotations of the compressor.

10. The vehicle air conditioning apparatus according to claim 8, further comprising:
- a frost formation estimator configured to estimate a temperature at which a frost is formed on the heat exchanger; and
- a controller configured to control the evaporating temperature of the refrigerant in the heat exchanger by regulating the opening of the evaporating temperature control valve, based on the temperature detected by the temperature detector and the temperature estimated by the frost formation estimator.

11. A vehicle air conditioning apparatus comprising:
- a compressor configured to compress and discharge a refrigerant;
- a radiator provided in a vehicle interior and configured to release heat from the refrigerant;
- a heat exchanger provided in the vehicle interior and configured to absorb the heat into the refrigerant;
- an outdoor heat exchanger provided outside the vehicle interior and configured to release the heat from the refrigerant or absorb the heat into the refrigerant;
- an indoor expansion valve configured to decompress the refrigerant flowing into the heat exchanger; and
- an outdoor expansion valve configured to decompress the refrigerant flowing into the outdoor heat exchanger,
the vehicle air conditioning apparatus performing a heating and dehumidifying operation to release the heat from the refrigerant discharged from the compressor in the radiator; to decompress part of the refrigerant by the indoor expansion valve and absorb the heat into the refrigerant in the heat exchanger; and to decompress a remaining refrigerant by the outdoor expansion valve and absorb the heat into the remaining refrigerant in the outdoor heat exchanger,
the vehicle air conditioning apparatus further comprising:
- an outdoor expansion valve controller configured to control an evaporating temperature of the refrigerant in the heat exchanger by regulating an opening of the outdoor expansion valve during the heating and dehumidifying operation;
- an evaporating temperature control valve provided in a refrigerant flow passage to an output side of the heat exchanger from which the refrigerant is discharged, and configured to control the evaporating temperature of the refrigerant in the heat exchanger by regulating an amount of the refrigerant flowing through the refrigerant flow passage;
- a temperature detector configured to detect a temperature of the refrigerant in the heat exchanger;
- a control changer configured to switch control of the evaporating temperature of the refrigerant in the heat exchanger from regulating an opening of the evaporating temperature control valve to regulating an opening of the outdoor expansion valve, based on the temperature detected by the temperature detector and the temperature calculated by the target evaporating temperature calculator; and
- a target evaporating temperature calculator configured to calculate a target evaporating temperature that is a target value of the evaporating temperature of the refrigerant in the heat exchanger.

12. The vehicle air conditioning apparatus according to claim 11, further comprising a valve opening controller configured to regulate the opening of the outdoor expansion valve, based on the temperature detected by the temperature detector and the temperature calculated by the target evaporating temperature calculator.

13. The vehicle air conditioning apparatus according claim 11, further comprising a radiator temperature controller configured to control the temperature of the refrigerant in the radiator by controlling a number of rotations of the compressor.

14. The vehicle air conditioning apparatus according to claim 11, further comprising:
- a frost formation estimator configured to estimate a temperature at which a frost is formed on the heat exchanger; and
- a controller configured to control the evaporating temperature of the refrigerant in the heat exchanger by regulating the opening of the evaporating temperature control valve, based on the temperature detected by the temperature detector and the temperature estimated by the frost formation estimator.

* * * * *